(12) United States Patent
Nishioka et al.

(10) Patent No.: US 12,254,097 B2
(45) Date of Patent: Mar. 18, 2025

(54) EVALUATION APPARATUS, EVALUATION METHOD, AND PROGRAM

(71) Applicant: NEC Corporation, Tokyo (JP)

(72) Inventors: Jun Nishioka, Tokyo (JP); Yoshiaki Sakae, Tokyo (JP); Kazuhiko Isoyama, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 359 days.

(21) Appl. No.: 17/767,138

(22) PCT Filed: Oct. 25, 2019

(86) PCT No.: PCT/JP2019/041929
§ 371 (c)(1),
(2) Date: Apr. 7, 2022

(87) PCT Pub. No.: WO2021/079496
PCT Pub. Date: Apr. 29, 2021

(65) Prior Publication Data
US 2022/0391516 A1  Dec. 8, 2022

(51) Int. Cl.
*G06F 21/00* (2013.01)
*G06F 21/57* (2013.01)

(52) U.S. Cl.
CPC ...... *G06F 21/577* (2013.01); *G06F 2221/033* (2013.01)

(58) Field of Classification Search
CPC ..... G06F 21/577; G06F 2221/033; G06F 8/77
See application file for complete search history.

(56) References Cited

U.S. PATENT DOCUMENTS

| | | | |
|---|---|---|---|
| 10,528,741 B1* | 1/2020 | Collins | G06F 21/577 |
| 2004/0030628 A1* | 2/2004 | Takamoto | G06Q 40/06 |
| | | | 705/36 R |
| 2005/0055565 A1* | 3/2005 | Fournet | G06F 21/577 |
| | | | 726/26 |
| 2008/0033700 A1 | 2/2008 | Kano et al. | |
| 2015/0007330 A1 | 1/2015 | Gomez | |

(Continued)

FOREIGN PATENT DOCUMENTS

| | | |
|---|---|---|
| JP | 2001-184441 A | 7/2001 |
| JP | 2008-040760 A | 2/2008 |

(Continued)

OTHER PUBLICATIONS

International Search Report for PCT Application No. PCT/JP2019/041929, mailed on Dec. 24, 2019.

(Continued)

*Primary Examiner* — Michael M Lee

(57) ABSTRACT

In order to provide an evaluation apparatus that appropriately evaluates risk of a source code changing over time, an evaluation apparatus includes a generating unit and an output unit. The generating unit generates an evaluation related to risk of a first library described in a source code. The output unit calculates the degree of risk of the fist library, based on at least the generated evaluation, calculates a risk value indicating risk inherent in the source code, based on the calculated degree of risk, and also outputs time-series data of the calculated risk value.

9 Claims, 28 Drawing Sheets

(56) References Cited

U.S. PATENT DOCUMENTS

| | | |
|---|---|---|
| 2015/0268948 A1 | 9/2015 | Plate |
| 2015/0363196 A1 | 12/2015 | Carback, III et al. |
| 2016/0188449 A1 | 6/2016 | Machida |
| 2018/0349614 A1 | 12/2018 | Ionescu et al. |
| 2019/0227902 A1 | 7/2019 | Cheng et al. |
| 2020/0242254 A1* | 7/2020 | Velur .................... G06F 21/552 |

FOREIGN PATENT DOCUMENTS

| | | |
|---|---|---|
| JP | 2010-191922 A | 9/2010 |
| JP | 2010-257091 A | 11/2010 |
| JP | 2017-520842 A | 7/2017 |
| WO | 2015/022890 A1 | 2/2015 |

OTHER PUBLICATIONS

English translation of Written opinion for PCT Application No. PCT/JP2019/041929, mailed on Dec. 24, 2019.

GitHub Developer,"GitHub Developer Guide", retrieved on Apr. 1, 2022, <URL: https://developer.github.com/>, pp. 1-2.

Techmatrix, "Source code analysis tools", retrieved on Apr. 1, 2022, <URL: https://www.techmatrix.co.jp/product/understand/function/metrics.html>, pp. 1-5.

Toyo Corporation, "OSS Risk Management Tools, Checkmarx CxOSA", Prometech Simulation Conference 2018, Dec. 13, 2018, pp. 1-4.

\* cited by examiner

Application

```
1    Import L123
2    Import L345
        ⋮

3    Main() {
4     Function A()
5     Function B()
        ⋮
     }

6    Function A() {
7     L123.call()
8     L123.get()
        ⋮
     }

9    Function B() {
10    L123.call()
11    L345.call()
        ⋮
     }
```

Fig. 4A

```
L123
1    Import L911
2    Import L912
        ⋮

3    call () {
4      L911.put()
        ⋮
     }

5    get () {
6      L912.delete()
        ⋮
     }
```

```
1      Import L811

2      put () {
         L811.get()
              ⋮
       }
```

Fig. 4C

LIBRARY CONFIGURATION INFORMATION

| LIBRARY | SUBORDINATE LIBRARY |
|---------|---------------------|
| L123    | L911, L912          |
| L345    | None                |
| L911    | L811                |
| L912    | None                |
| ⋮       | ⋮                   |

Fig. 5

| LIBRARY | STATIC EVALUATION | DYNAMIC EVALUATION | ENTITY EVALUATION |
|---|---|---|---|
| L123 | A11 | B11 | C11 |
| L345 | A12 | B12 | C12 |
| L911 | A13 | B13 | C13 |
| L912 | A14 | B14 | C14 |
| ... | ... | ... | ... |

Fig. 6

LIBRARY EVALUATION RESULT

| LIBRARY | STATIC EVALUATION | DYNAMIC EVALUATION | ENTITY EVALUATION | RISK FACTOR |
|---|---|---|---|---|
| L123 | A11 | B11 | C11 | L911(A13) |
| L345 | A12 | B12 | C12 | None |
| L911 | A13 | B13 | C13 | None |
| L912 | A14 | B14 | C14 | None |
| ... | ... | ... | ... | ... |

Fig. 7

| LIBRARY | LIBRARY INFLUENCE DEGREE |
|---|---|
| L123 | E11 |
| L345 | E12 |
| L911 | E13 |
| L912 | E14 |
| ⋮ | ⋮ |

Fig. 8

| LIBRARY | STATIC EVALUATION | DYNAMIC EVALUATION | ENTITY EVALUATION | RISK FACTOR | LIBRARY INFLUENCE DEGREE |
|---|---|---|---|---|---|
| L123 | A11 | B11 | C11 | L911(A13) | E11 |
| L345 | A12 | B12 | C12 | None | E12 |
| L911 | A13 | B13 | C13 | None | E13 |
| L912 | A14 | B14 | C14 | None | E14 |
| ... | ... | ... | ... | ... | ... |

LIBRARY EVALUATION INFORMATION

Fig. 9

LIST OF RISK VALUES

| LIBRARY | RISK VALUE |
|---------|------------|
| L123 | F11 |
| L345 | F12 |
| L911 | F13 |
| L912 | F14 |
| ⋮ | ⋮ |

Fig. 14A

LIST OF RISK OF LIBRARIES

| LIBRARY | RISK |
|---------|------|
| L123 | HIGH |
| L345 | LOW |
| L911 | LOW |
| L912 | LOW |
| ⋮ | ⋮ |

Fig. 14B

DETAILS OF METADATA

| METADATA (INDEX) | VALUE |
|---|---|
| DIFFERENCE FROM LATEST COMMIT | DELAY OF 3 COMMITS |
| NUMBER OF COMMITS/DAY | 0.1 |
| NUMBER OF COMMITTERS | 4 |
| AVERAGE COMMIT SIZE | 30L |
| AVERAGE PERIOD FOR ISSUE RESOLUTION | 10 Day |
| RATE OF ISSUE OCCURRENCE | 3/Week |
| ⋮ | ⋮ |

Fig. 17

WARNING!

THERE IS HIGH RISK IN
CURRENT SOURCE CODE.

Fig. 20

WARNING!

THERE IS HIGH RISK IN LIBRARY L123.

Fig. 21

| LIBRARY | STATIC EVALUATION | DYNAMIC EVALUATION | ENTITY EVALUATION | RISK FACTOR 1 | RISK FACTOR 2 |
|---|---|---|---|---|---|
| L123 | A11 | B11 | C11 | L911(A13) | L811(A15) |
| L345 | A12 | B12 | C12 | None | None |
| L911 | A13 | B13 | C13 | None | None |
| L912 | A14 | B14 | C14 | None | None |
| ... | ... | ... | ... | ... | ... |

LIBRARY EVALUATION RESULT

Fig. 24

EVALUATION APPARATUS, EVALUATION METHOD, AND PROGRAM

This application is a National Stage Entry of PCT/JP2019/041929 filed on Oct. 25, 2019, the contents of all of which are incorporated herein by reference, in their entirety.

BACKGROUND

Technical Field

The present invention relates to an evaluation apparatus, an evaluation method, and a program.

Background Art

Recent years have seen a steady increase in scale of software (application programs), and this has led to a situation where it is difficult to develop all source codes on your own. Hence, development using source codes developed by third parties called open source software (OSS) and the like is actively carried out. For example, part of the functions of an application program is implemented by a library opened to the public as OSS.

PTL 1 describes solving difficulty in grasping an influence of change in such a development process that dependency is generated at any unpredictable timing in parallel development. PTL 2 describes providing a risk degree determination program that can predict a part of software where a structural failure occurs. PTL 3 describes providing a system and a method that enable good use of a large number of software files for automating important aspects in software development and maintenance, and recovery life cycle. PTL 4 describes performing a load test at such an appropriate frequency as not to cause a decrease in efficiency of software development and a decrease in accuracy of detecting software aging.

CITATION LIST

Patent Literature

[PTL 1] JP 2008-040760 A
[PTL 2] JP 2010-257091 A
[PTL 3] JP 2017-520842 A
[PTL 4] WO 2015/022890

SUMMARY

Technical Problem

As described above, a library opened to the public as open source software is used in development of an application program in some cases.

At incorporation of a library into an application program, verification is normally performed on the library. Concretely, verification is performed in terms of presence/absence and the like of vulnerability information related to a library planned to be used and behavior of a case where the library is incorporated into a source code.

Moreover, libraries have become more and more complex such that each library has multi-level dependency, for example, the library itself depends on another library (calls another library). Hence, it is not uncommon for the library itself to have vulnerability such as bugs and security holes.

Here, a careful verification is performed on a library planned to be used, at the time of introduction of the library, but a check after the introduction is often limited to a simple check such as an operation check. In other words, it is often the case that emphasis is put on development of an application program itself and verification of the library after the introduction is not regarded as important.

However, revision of the source code on a side using (a side calling) the library advances as the project proceeds, which also changes the use mode of the library. For example, although only one function calls the library at the time of introduction of the library, a plurality of functions result in calling the library as the development proceeds in some cases.

This case results in expansion of the influence of the vulnerability of the library on the whole application program. However, as described above, careful verification of the library is performed at the time of introduction of the library, while equivalent verification is less likely to be performed after the introduction of the library. This consequently leads to a possibility that serious influence of the vulnerability of the library on a system (the whole application program) is failed to be noticed. In other words, the influence of the vulnerability of the library on the application program changes with time, but the degree of influence from the library cannot be appropriately evaluated in the current scheme for system development.

A main example object of the present invention is to provide an evaluation apparatus, an evaluation method, and a program that contribute to appropriately evaluating risk of a source code changing over time.

Solution to Problem

A first aspect of the present invention provides an evaluation apparatus including: a generating unit configured to generate an evaluation related to risk of a first library described in a source code; and an output unit configured to calculate a degree of risk of the first library, based on at least the generated evaluation, calculate a risk value indicating risk inherent in the source code based on the calculated degree of risk, and output time-series data of the calculated risk value.

A second aspect of the present invention provides an evaluation method including, in an evaluation apparatus: generating an evaluation related to risk of a first library described in a source code; and calculating a degree of risk of the first library, based on at least the generated evaluation, calculating a risk value indicating risk inherent in the source code based on the calculated degree of risk, and outputting time-series data of the calculated risk value.

A third aspect of the present invention provides a program causing a computer mounted in an evaluation apparatus to execute: processing of generating an evaluation related to risk of a first library described in a source code; and processing of calculating a degree of risk of the first library, based on at least the generated evaluation, calculating a risk value indicating risk inherent in the source code based on the calculated degree of risk, and outputting time-series data of the calculated risk value.

Advantageous Effects of Invention

According to each viewpoint of the present invention, an evaluation apparatus, an evaluation method, and a program that contribute to appropriately evaluating risk of a source code changing over time. Note that, according to the present invention, instead of or together with the above effects, other effects may be exerted.

BRIEF DESCRIPTION OF THE DRAWINGS

FIGS. 4A to 4C are diagrams each illustrating an example of a source code obtained by the evaluation apparatus according to the first example embodiment;

FIG. 5 is a diagram illustrating an example of library configuration information;

FIG. 6 is a diagram illustrating an example of information generated by a risk evaluation generating unit;

FIG. 7 is a diagram illustrating an example of a library evaluation result;

FIG. 8 is a diagram illustrating an example of library influence degree calculated by a library influence degree calculating unit;

FIG. 9 is a diagram illustrating an example of library evaluation information;

FIGS. 14A and 14B are each a diagram illustrating an example of the display by the evaluation apparatus according to the first example embodiment;

FIG. 17 is a diagram illustrating an example of the display by the evaluation apparatus according to the first example embodiment;

FIG. 20 is a diagram illustrating an example of display by the evaluation apparatus according to the second example embodiment;

FIG. 21 is a diagram illustrating an example of the display by the evaluation apparatus according to the second example embodiment;

FIG. 24 is a diagram illustrating an example of a library evaluation result.

DESCRIPTION OF THE EXAMPLE EMBODIMENTS

Figure 1:
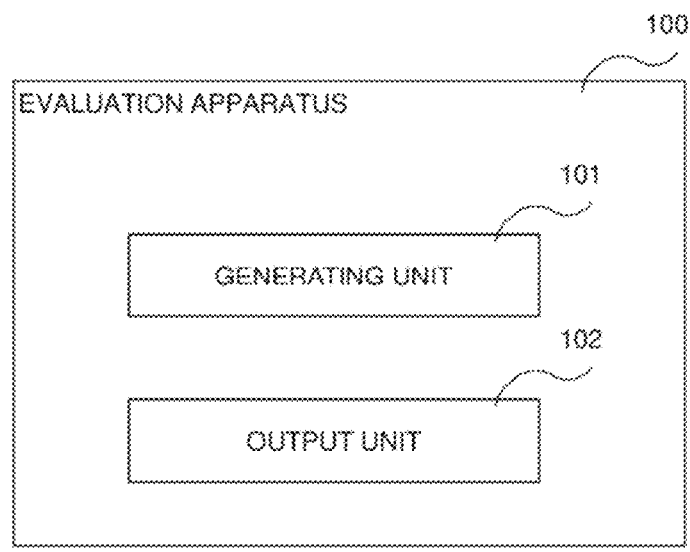
FIG. 1 is a diagram for describing an overview of an example embodiment.

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

An evaluation apparatus 100 according to an example embodiment includes a generating unit 101 and an output unit 102 (see FIG. 1). The generating unit 101 generates an evaluation related to risk of a first library described in a source code. The output unit 102 calculates the degree of risk of the first library, based on at least the generated evaluation, calculates a risk value indicating risk inherent in the source code, based on the calculated degree of risk, and also outputs time-series data of the calculated risk value.

The evaluation apparatus 100 evaluates each library itself described in the source code and digitizes the risk of the library as the degree of risk. The evaluation apparatus 100 visualizes the risk of the source code from a viewpoint of the library and displays the time-series variation of the risk. A user who faces the display can appropriately evaluate the risk of the source code changing over time.

Specific example embodiments will be described below in further detail with reference to the drawings.

First Example Embodiment

A first example embodiment will be described in further detail with reference to the drawings.

Figure 2:
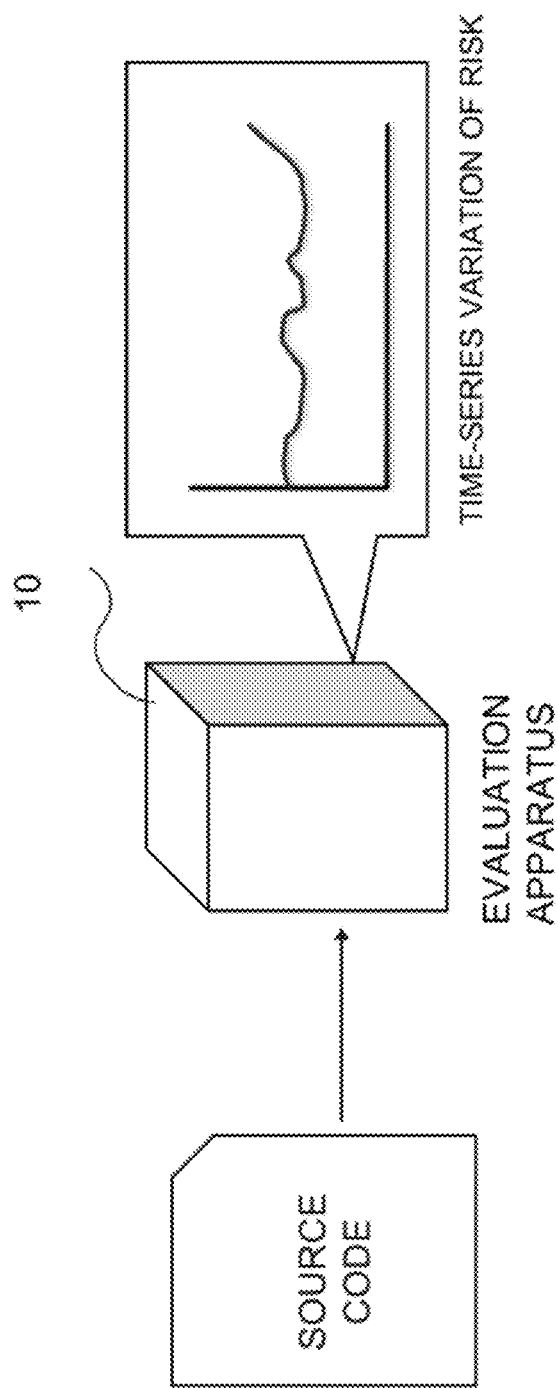
FIG. 2 is a diagram for describing an evaluation apparatus according to a first example embodiment.

FIG. 2 is a diagram for describing an evaluation apparatus 10 according to the first example embodiment. The evaluation apparatus 10 is an apparatus that evaluates the risk inherent in a source code such as an application program. The evaluation apparatus 10 obtains a source code subject to evaluation of risk.

The evaluation apparatus 10 digitizes risk of the source code and presents the digitized risk to a user (such as an administrator of the application program). At this time, the evaluation apparatus 10 presents, to the user, time-series variation related to the risk of the source code (a project generated using the source code).

For example, the evaluation apparatus 10 displays the time-series data of the risk on a liquid crystal monitor or the like. Alternatively, the evaluation apparatus 10 may transmit the time-series data to a predetermined address or the like or may print out the time-series data by using a printer or the like.

Figure 3:
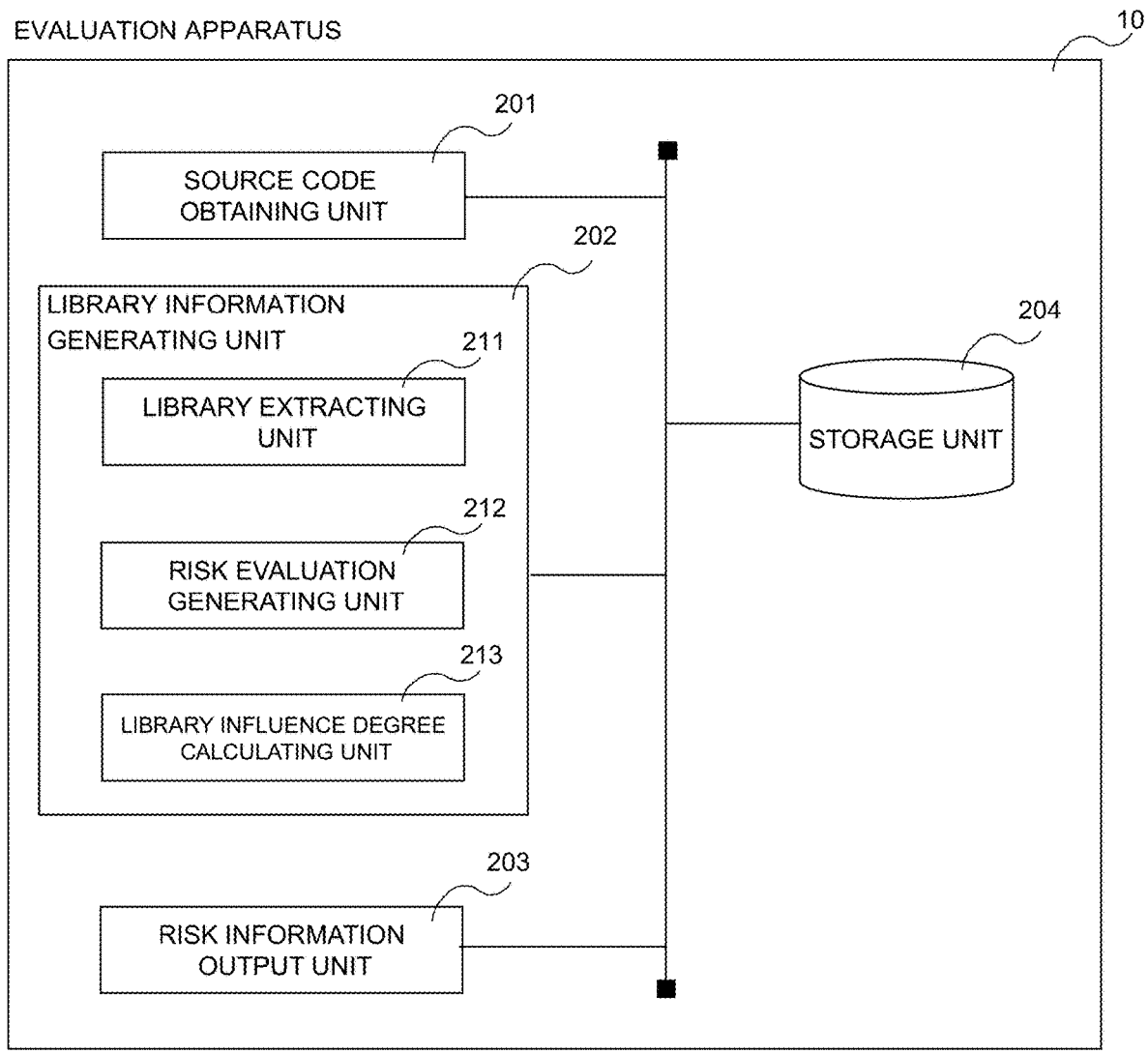
FIG. 3 is a diagram illustrating an example of a processing configuration of the evaluation apparatus according to the first example embodiment.

FIG. 3 is a diagram illustrating an example of a processing configuration (processing module) of the evaluation apparatus 10 according to the first example embodiment. With reference to FIG. 3, the evaluation apparatus 10 includes a source code obtaining unit 201, a library information generating unit 202, a risk information output unit 203, and a storage unit 204.

The source code obtaining unit 201 is a means for obtaining a source code subject to risk evaluation. For example, the source code obtaining unit 201 may generate graphical user interface (GUI) information for an administrator or the like to input (specify) a source code subject to evaluation and obtain the source code by using the GUI. Alternatively, the source code obtaining unit 201 may obtain the source code via an external storage apparatus such as a universal serial bus (USB) memory or the like, or may access an external database server or the like to obtain the source code.

Figure 4C:
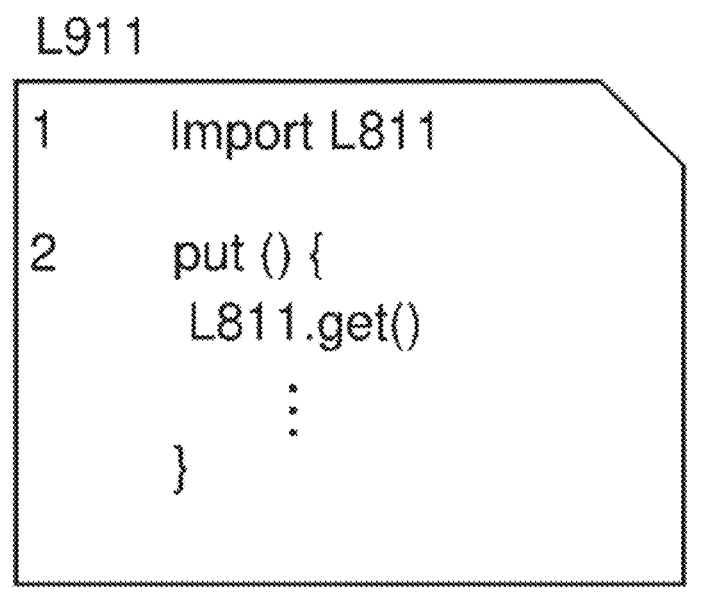

For example, the source code obtaining unit 201 obtains a source code as those illustrated in FIGS. 4A to 4C. FIG. 4A illustrates an example of a source code including a main function, and FIGS. 4B and 4C illustrate examples of a source code of a library. Note that the source code obtained by the source code obtaining unit 201 includes a README file accompanying the source code, a file generated by compiling the source code, a directory in which the source code is stored, and the like.

The source code obtaining unit 201 stores, in the storage unit 204, the obtained source code and identification information (for example, a project name) of the source code in association with each other.

The library information generating unit 202 is a means for generating information for evaluating a library described in the obtained source code (referred to as library evaluation information below).

As illustrated in FIG. 3, the library information generating unit 202 includes a library extracting unit 211, a risk evaluation generating unit 212, and a library influence degree calculating unit 213.

The library extracting unit 211 is a means for extracting the library described in the obtained source code. The library extracting unit 211 scans the source code to extract the library described in the source code. Concretely, the library extracting unit 211 checks a region declaring a library to use (for example, a start region of a file in which import declaration is described) and extracts the library described in the region.

In the example in FIGS. 4A to 4C, the library extracting unit 211 extracts libraries "L123" and "L345" described in the first and second lines in FIG. 4A. The library extracting unit 211 extracts libraries "L911" and "L912" described in the first and second lines in FIG. 4B. The library extracting unit 211 extracts a library "L811" described in the first line in FIG. 4C.

When the extraction of the libraries described in the source codes is completed, the library extracting unit 211 detects the dependencies among the extracted libraries. Concretely, the library extracting unit 211 detects a child library (subordinate library) used by each of the libraries (called by each of the libraries) and detects the dependency (subordination) of the libraries.

The library extracting unit 211 bring the dependencies among the detected libraries together as "library configuration information". For example, in the example in FIGS. 4A to 4C, the library "L123" includes the libraries "L911" and "L912". Hence, dependency is confirmed between the library "L123" and each of the libraries "L911" and "L912". The library "L911" includes the library "L811". Hence, dependency is confirmed between these libraries.

The library extracting unit 211 generates library configuration information as that illustrated in FIG. 5, based on the dependencies among the detected libraries.

With reference to FIG. 5, it can be understood that the library "L123", as a reference, includes "L911" and "L912", which are child libraries, and further includes "L811", which is a grandchild library.

Note that, although a case of having three hierarchical levels (parent, child, grandchild) as hierarchical levels of the libraries in FIG. 5, this hierarchical structure is, of course, an example. It is apparent that an evaluation-target source code may have a structure of three or more hierarchical levels.

The risk evaluation generating unit 212 is a means for generating an evaluation related to risk of each library described in each source code. The risk evaluation generating unit 212 generates an evaluation indicating risk of each extracted library itself Concretely, the risk evaluation generating unit 212 digitizes risk of a single library to be the evaluation.

Note that, in the following description, the risk evaluation for the single library performed by the risk evaluation generating unit 212 is referred to as "library unit evaluation".

The risk evaluation generating unit 212 performs library unit evaluation from various example aspects. Concretely, the risk evaluation generating unit 212 evaluates each library, based on pieces of information different in property from each other, and generates an evaluation for each of the pieces of information different from each other.

The risk evaluation generating unit 212 evaluates the evaluation-target library by using a stable index which has little temporal variation related to the library. For example, the risk evaluation generating unit 212 calculates an evaluation, based on static information such as a directory configuration, presence/absence of a README file, presence/absence of a test directory, and the like of the evaluation-target library.

For example, the risk evaluation generating unit 212 provides a small evaluation when the directory configuration of the evaluation-target library is simple (for example, the number of hierarchical levels is smaller than a predetermined value or the like) while providing a large evaluation when the directory configuration is complex. The determination of an evaluation is based on the knowledge that a complex directory configuration relatively increases the risk (the degree of risk) of a corresponding library.

The risk evaluation generating unit 212 may provide a small evaluation when a README file and/or a test directory exists while providing a large evaluation when a README and/or a test directory does not exist. The determination of an evaluation is performed because it is possible to determine that, when a README file and/or a test directory exists, management and evaluation (debugging) of the corresponding library is sufficient.

The risk evaluation generating unit 212 calculates an evaluation by using all or part of the items (for example, a directory configuration, presence/absence of a README file, and presence/absence of a test directory).

Note that, in the following description, an evaluation determined based on static information such as a directory configuration is referred to as a "static evaluation".

The risk evaluation generating unit 212 may evaluate the library by using information varying over time (for example, metadata related to the evaluation-target library). For example, the risk evaluation generating unit 212 calculates an evaluation, based on metadata such as the "issue resolution rate", the "number of commits", the "code generator (creator)", and/or the like related to the evaluation-target library.

For example, the risk evaluation generating unit 212 may perform threshold processing on the issue resolution rate or the number of commits and calculate an evaluation according to the result of the threshold processing. More concretely, the risk evaluation generating unit 212 provides a small evaluation when the issue resolution rate or the like is equal to or higher than a threshold while providing a large evaluation when the issue resolution rate or the like is lower than the threshold. Alternatively, the risk evaluation generating unit 212 may determine an evaluation according to a numeric range to which the issue resolution rate or the like belongs. The determination of an evaluation is based on the knowledge that, when the issue resolution rate or the number of commits is greater than a predetermined value, development of the corresponding library is ongoing, and it is hence reasonable to evaluate the risk to be low.

The risk evaluation generating unit 212 may determine an evaluation according to whether or not the code generator is a predetermined person. For example, the risk evaluation generating unit 212 refers to a list of people who have generated a number of secure libraries with little vulnerability (a whitelist prepared in advance). The risk evaluation generating unit 212 provides, when the generator of the evaluation-target library is included in the list, a small evaluation to the corresponding library.

The risk evaluation generating unit 212 may refer to a list of people who have generated a number of imperfect libraries for which vulnerability is reported a number of times (a blacklist prepared in advance). The risk evaluation generating unit 212 may provide, when the generator of the evaluation-target library is included in the list, a large evaluation to the corresponding library.

The risk evaluation generating unit 212 calculates an evaluation by using all or part of the items (for example, the issue resolution rate, the number of commits, and the code generator).

Note that, in the following description, an evaluation determined based on dynamic information (metadata) such as the issue resolution rate is referred to as a "dynamic evaluation". The issue resolution rate and the like are examples of metadata, and a dynamic evaluation may be calculated by using other information such as common vulnerabilities and exposures (CVE), the commit size, and the update frequency, for example. Alternatively, a dynamic evaluation may be calculated by using the distance (the degree of divergence) between the version of library in use and the latest version (the latest commit). For example, the difference between the latest version and the version of the library in use may be calculated to calculate a dynamic evaluation, based on a numeric range including the difference. Alternatively, by changing weights for a major version and a minor version, a dynamic evaluation may be calculated large (the risk may be calculated high) when there is a large difference with respect to the measure version.

Here, when the library in use is a library opened to the public as open source software, metadata to be a basis in calculating the dynamic evaluation is often opened to the public in a network. The risk evaluation generating unit 212 only needs to obtain the metadata opened to the public in the network and calculate the dynamic evaluation. As an example of the metadata opened to the public, reference information 1 below is given as an example.
<Reference Information 1>
URL: developer.github.com The risk evaluation generating unit 212 may evaluate the evaluation-target library by using the source code of the library. For example, the risk evaluation generating unit 212 calculates an evaluation, based on the number of comments described in the source code of the evaluation-target library, the complexity of the code, the name of a function described in the source code, and/or the like.

For example, the risk evaluation generating unit 212 may perform threshold processing on the number of comments or the complexity of the code and determine an evaluation according to the result of the through the threshold processing. More concretely, the risk evaluation generating unit 212 provides a small evaluation when the number of comments or the like is equal to or higher than a threshold while providing a large evaluation when the number of comments or the like is lower than the threshold.

The risk evaluation generating unit 212 may determine an evaluation according to whether or not the name of the function described in the source code of the evaluation-target library conforms to a predetermined rule (or how much the name of the function is divergent from the predetermined rule).

The risk evaluation generating unit 212 calculates an evaluation by using all or part of the items (for example, the number of comments, the complexity of the code, and the name of the function).

Note that, in the following description, an evaluation determined based on information described in the source code of the evaluation-target library such as the complexity of the code is referred to as an "entity evaluation".

The risk evaluation generating unit 212 may calculate the entity evaluation, based on the information described in reference information 2 below. Reference information 2 describes the metrics of the number of lines of the source code and cyclomatic complexity of the code.
<Reference Information 2>
URL: www.techmatrix.co.jp/product/understand/function/metrics.html As described above, the risk evaluation generating unit 212 performs unit evaluation related to the evaluation-target library from various example aspects. Specifically, the risk evaluation generating unit 212 performs library unit evaluation from various example aspects using static information such as the directory configuration of the evaluation-target library, dynamic information such as metadata, entity information based on the source code, and the like.

The three types of unit evaluation are examples and are not intended to limit the contents performed in the library unit evaluation by the risk evaluation generating unit 212. The risk evaluation generating unit 212 only needs to perform at least one or more types of evaluation of the three types of unit evaluation and may further perform evaluation different from the three types of unit evaluation.

The risk evaluation generating unit 212 performs the above-described library unit evaluation on the extracted library. For example, the risk evaluation generating unit 212 generates information as that illustrated in FIG. 6 and stores the information in the storage unit 204.

In a case where, in a library, another library is called, the risk evaluation generating unit 212 evaluates the library by taking account of a result of library unit evaluation related to such another library. Specifically, in a case where a library includes a child library, the risk evaluation generating unit 212 evaluates the parent library by taking account of a result of unit evaluation related to the child library (generates information for evaluating the parent library).

In the example in FIG. 5, a relationship between the library "L123" as a parent library and "L911" and "L912" as child libraries is illustrated, and hence a result of unit evaluation of each of the child libraries "L911" and "L912" is reflected in evaluation of the parent library "L123".

The risk evaluation generating unit 212 identifies, when the evaluation-target library includes child libraries, the evaluation having the largest value (indicating the highest risk) among evaluations of unit evaluation related to the child libraries. For example, in the example in FIG. 5, since the two child libraries "L911" and "L912" are included in the library "L123", the evaluation having the largest value is identified among evaluations of unit evaluation related to the two child libraries.

In the example in FIG. 6, in a case where the value of an evaluation A13 is the largest among evaluations A13, B13, C13, A14, B14, and C14, the evaluation A13 is identified. The risk evaluation generating unit 212 treats the library (the child library) corresponding to the identified evaluation as a risk factor for the evaluation-target library (the parent library). In the example, the library "L911" corresponding to the evaluation A13 is treated as the risk factor.

In this way, when dependency is confirmed between libraries, the risk evaluation generating unit 212 extracts a subordinate library as a risk factor for a parent library. When identification of a risk factor, based on library unit evaluation and dependency is completed, the risk evaluation generating unit 212 brings the unit evaluation and the risk factor together to generate a "library evaluation result". For example, the risk evaluation generating unit 212 generates a library evaluation result as that illustrated in FIG. 7.

The description is returned to FIG. 3. The library influence degree calculating unit 213 is a means for calculating the degree of influence indicating influence of each library included in a source code, on the whole source code (the whole project).

For example, the library influence degree calculating unit 213 counts, for each library included in the source code, the number of functions calling the library. In the example in FIGS. 4A to 4C, the library "L123" is called by Function A twice (the seventh and eighth lines) and Function B once (the tenth line), and hence the number of functions calling the library "L123" is "2". The library "L345" is called by Function B once (the eleventh line), and hence the number of functions calling the library "L123" is "1".

The library influence degree calculating unit 213 calculates the number of functions calling each library as a "library influence degree".

The library influence degree calculating unit 213 may calculate a library influence degree by taking account of the dependency of the functions included in the source code. For example, consider a case where a function A calling a library A exists and functions B to F further calling the function A are described in the source code. In this case, although the number of functions calling the library A directly is "1", the five functions B to F also call the library A indirectly, and hence the degree of influence of the library A may be calculated as "6=(1+5)". In other words, the library influence degree calculating unit 213 may calculate a library influence degree, based on the number of functions calling the library directly and the number of functions calling the library indirectly.

Note that functions may be called recursively in some source codes. For a library used by a function thus called recursively, the library influence degree calculating unit 213 may provide an extremely large value as the degree of influence of the library.

Alternatively, the library influence degree calculating unit 213 may calculate the number of times each library is called, as a "library influence degree". For example, in the example described above, the library "L123" is called three times as a whole, and hence the library influence degree is "3", while the library "L345" is called once as a whole, and hence the library influence degree is "1".

The library influence degree calculating unit 213 may calculate a library influence degree by using either the number of functions calling each library or the number of times each library is called, or may calculate a library influence degree by using these pieces of information. For example, the library influence degree calculating unit 213 may calculate the mean (for example, the arithmetic mean, the geometric mean, or the weighted mean) of the number of functions and the number of times of call and calculate the calculated mean value as the library influence degree.

The library influence degree calculating unit 213 calculates a library influence degree for each library included in the source code (refer to FIG. 8).

The library information generating unit 202 combines the library evaluation result generated by the risk evaluation generating unit 212 and the library influence degree calculated by the library influence degree calculating unit 213, to generate "library evaluation information" (refer to FIG. 9).

The risk information output unit 203 is a means for calculating the degree of risk of each library, based on the evaluation of the library, and calculating a risk value indicating risk inherent in the source code, based on the calculated degree of risk. Further, the risk information output unit 203 outputs time-series data of the calculated risk value. Specifically, the risk information output unit 203 generates and outputs risk information related to the source code subject to evaluation, based on the library evaluation information generated by the library information generating unit 202.

Concretely, the risk information output unit 203 generates risk information of an item specified by the administrator or the like. The risk information output unit 203 generates a GUI for inputting the risk information to be generated, and displays the GUI on a liquid crystal monitor or the like.

For example, as the risk information to be generated, the risk of the whole source code (the whole project) is indicated as an example. In this case, the risk information output unit 203 calculates the degree of risk for each library included in the evaluation-target source code and uses the total value of the calculated degrees of risk as the risk value of the whole source code.

For example, the risk information output unit 203 calculates, as the degree of risk for each library, the total of the unit evaluations (the static evaluation, the dynamic evaluation, and the entity evaluation) of the library. In the example in FIG. 9, "A11+B11+C11" is calculated as the degree of risk of library for the library "L123". Similarly, "A12+B12+C12" is calculated as the degree of risk of library for the library "L345". In this way, the risk information output unit 203 calculates, as the degree of risk for each library, the total of the evaluations (the static evaluation, the dynamic evaluation, and the entity evaluation) generated based on the respective pieces of information.

The risk information output unit 203 combines the degrees of risk of the respective libraries to calculate the risk value of the whole application program. In the example described above, "A11+B11+C11+A12+B12+C12+A13 . . . " is calculated as the risk value of the whole source code.

When calculating the degree of risk of each library, the risk information output unit 203 may reflect the risk factor and/or the library influence degree. For example, in a case of reflecting the risk factor, the risk information output unit 203 adds the evaluation of the risk factor to the total of the unit evaluation. In the example, "A11+B11+C11+A13" is calculated as the degree of risk of library for the library "L123".

In a case of reflecting the library influence degree, the risk information output unit 203 multiplies the total value of the unit evaluations by the library influence degree. For example, "(A11+B11+C11)*E11" is calculated as the degree of risk of library for the library "L123". Alternatively, by also reflecting the risk factor, "(A11+B11+C11+A13)*E11" may be calculated as the degree of risk of library for the library "L123".

Figure 10:
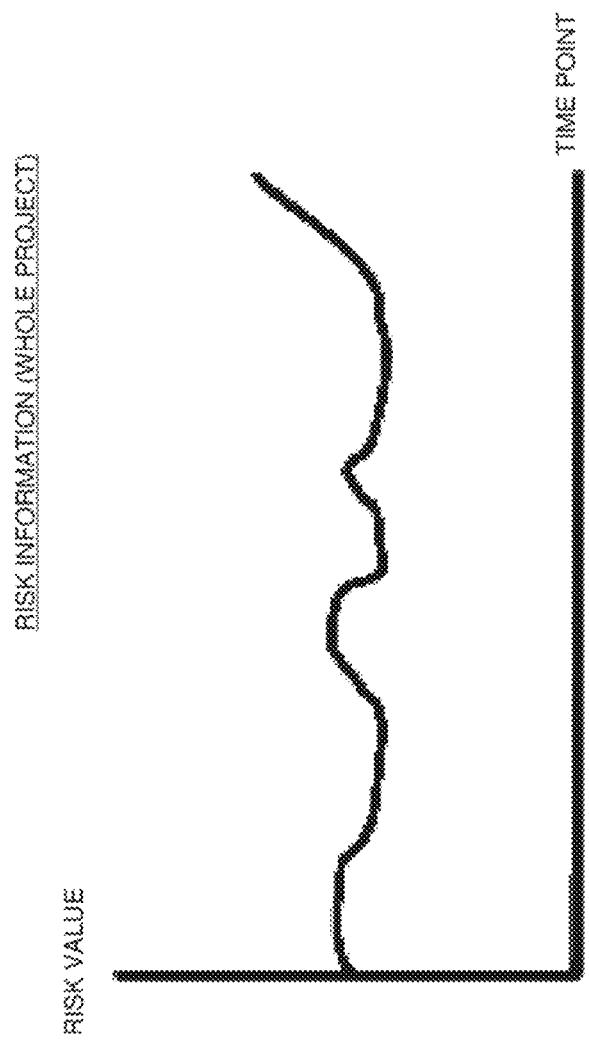
FIG. 10 is a diagram illustrating an example of time-series data of risk values stored in a storage section.

The risk information output unit 203 stores the generated risk information (the risk value) in the storage unit 204 together with the time point of the generation. For example, time-series data of risk values (a history of risk values) as that illustrated in FIG. 10 is stored in the storage unit 204.

The risk information output unit 203 may display the latest risk value (the current risk value) stored in the storage unit 204. Alternatively, the risk information output unit 203 may generate a graph indicating temporal transition of the risk values from the time-series data stored in the storage unit 204 (a graph as that illustrated in FIG. 10) and display the generated graph.

Figure 11:
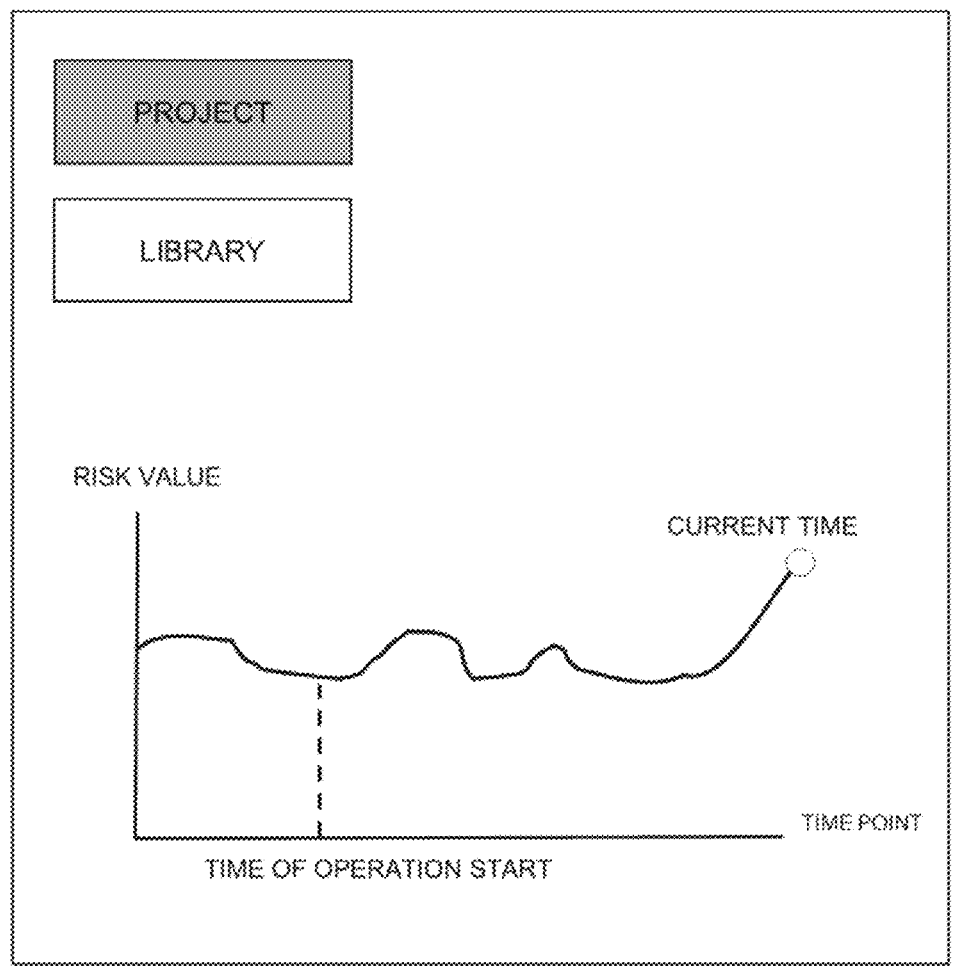
FIG. 11 is a diagram illustrating an example of display by the evaluation apparatus according to the first example embodiment.

For example, the risk information output unit 203 performs display as that illustrated in FIG. 11. FIG. 11 displays time-series data related to the risk values of the whole source code. As illustrated in FIG. 11, the risk information output unit 203 may calculate the total value of the degrees of risk calculated for the libraries included in the source code, as a risk value of the whole source code, and display time-series data of the calculated risk value of the whole source code.

The administrator who has come in contact with the risk information as that illustrated in FIG. 11 recognizes that the risk in the current stage has increased compared to that at the time of operation start of the project. Note that, although the risk values are displayed in the form of a line graph in FIG. 11, the risk values may be displayed in another form such as a bar graph.

The risk information output unit 203 may generate risk information related to individual libraries. For example, the administrator specifies libraries desired to evaluate the risks, by using a GUI. The risk information output unit 203 adds up the unit evaluations of the specified libraries, to calculate the degree of risk.

Figure 12:
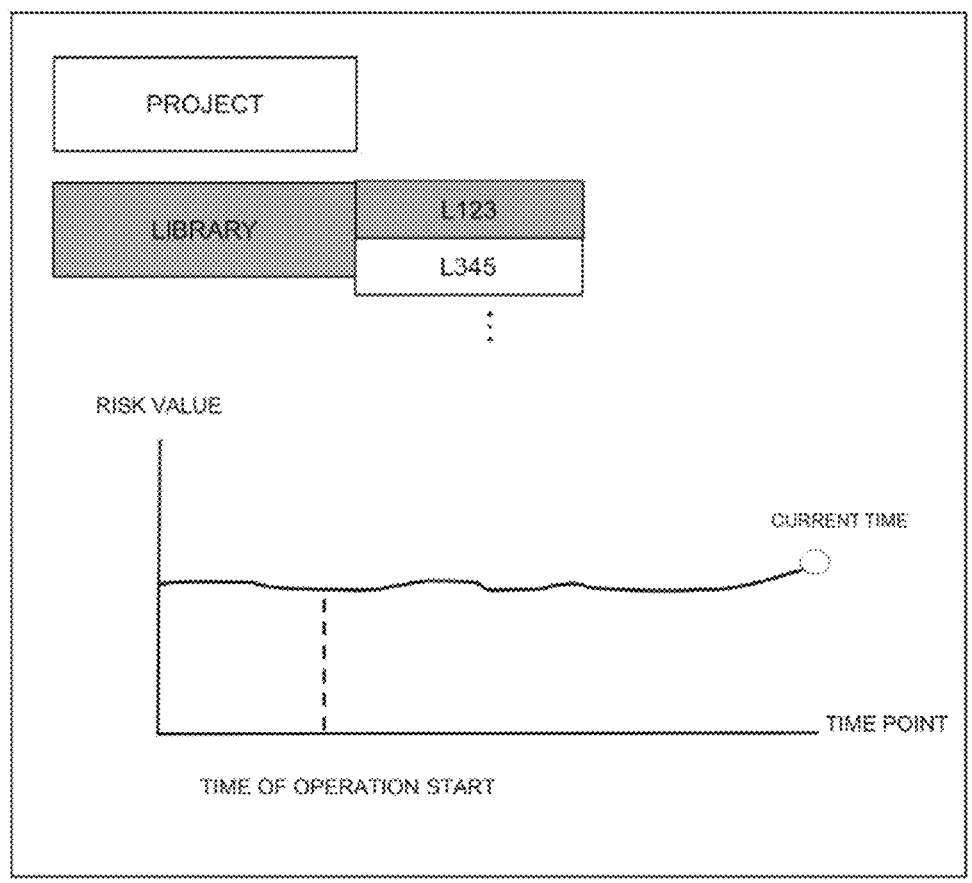
FIG. 12 is a diagram illustrating an example of the display by the evaluation apparatus according to the first example embodiment.

The risk information output unit 203 displays the calculated degree of risk as risk information (the risk value). For example, the risk information output unit 203 may provide display as that illustrated in FIG. 12. As illustrated in FIGS. 11 and 12, the risk information output unit 203 may generate a GUI for switching items (the whole project and the individual libraries) in terms of which time-series data of the risk values is displayed.

The risk information output unit 203 may display the individual data (the static evaluation, the dynamic evaluation, and the entity evaluation) related to the unit evaluation of each library. For example, the risk information output unit 203 may provide display as those illustrated in FIGS. 13A and 13B.

Figure 13A:
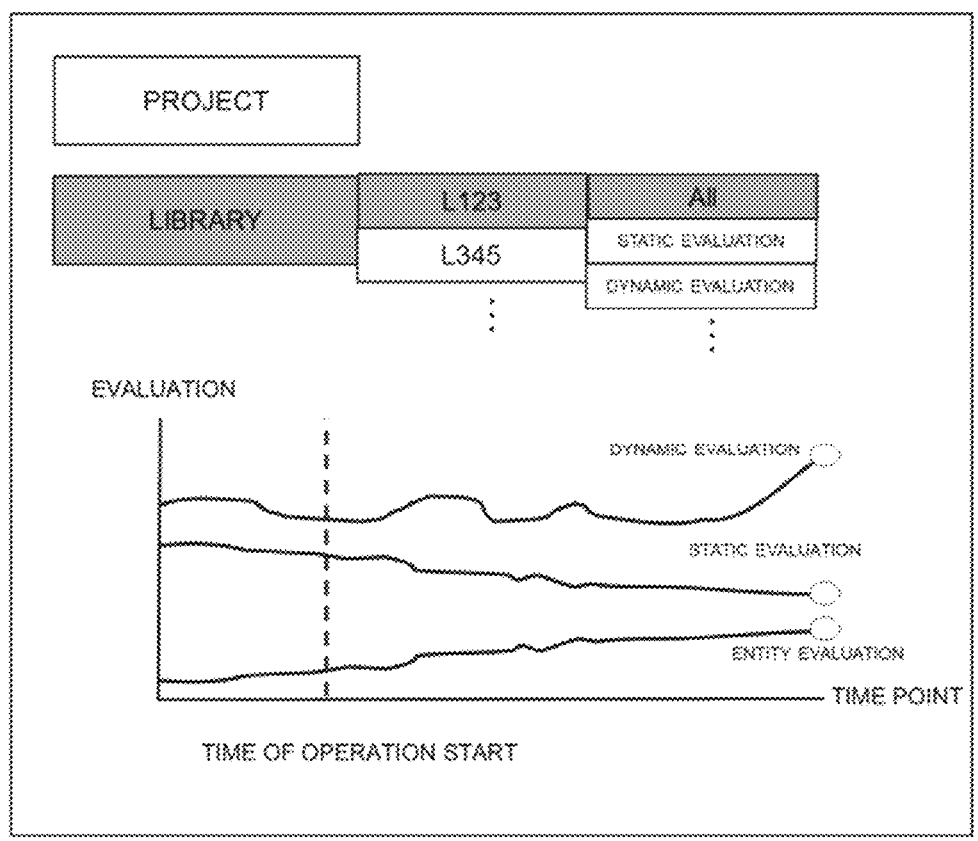
FIGS. 13A and 13B are each a diagram illustrating an example of the display by the evaluation apparatus according to the first example embodiment.
Figure 13B:
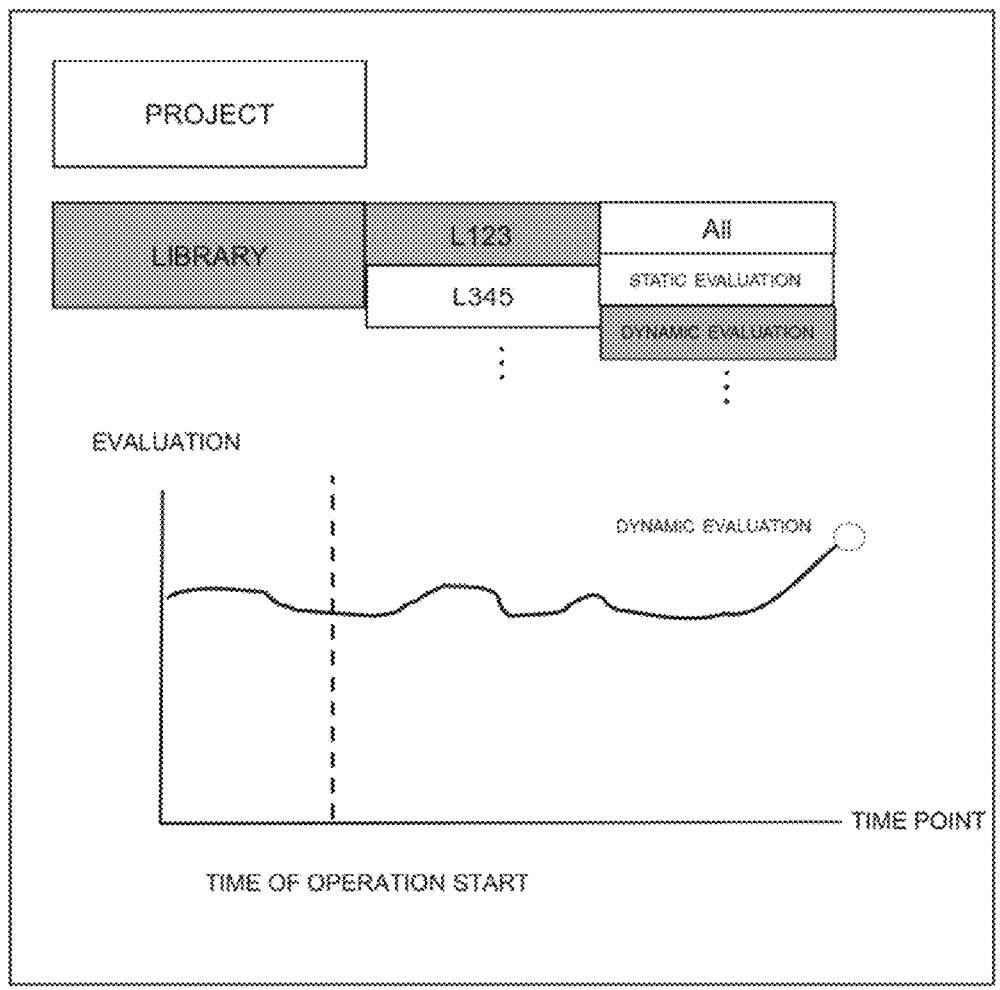

In FIG. 13A, three types of evaluations obtained as a result of unit evaluation of the library "L123" (time-series data of each type of evaluations) are displayed simultaneously. In FIG. 13B, time-series data related to the dynamic evaluations among the three types of evaluations constituting unit evaluation of the library "L123" is displayed. Alternatively, two of the three types of evaluations obtained as a result of unit evaluation may be selected and displayed.

The risk information output unit 203 may display a list of risk values of each library. For example, as illustrated in FIG. 14A, the risk information output unit 203 may display a library and a list of risk values of the library.

As illustrated in FIG. 14B, the risk information output unit 203 may perform threshold processing on the risk values and display a list of the results.

Figure 15:
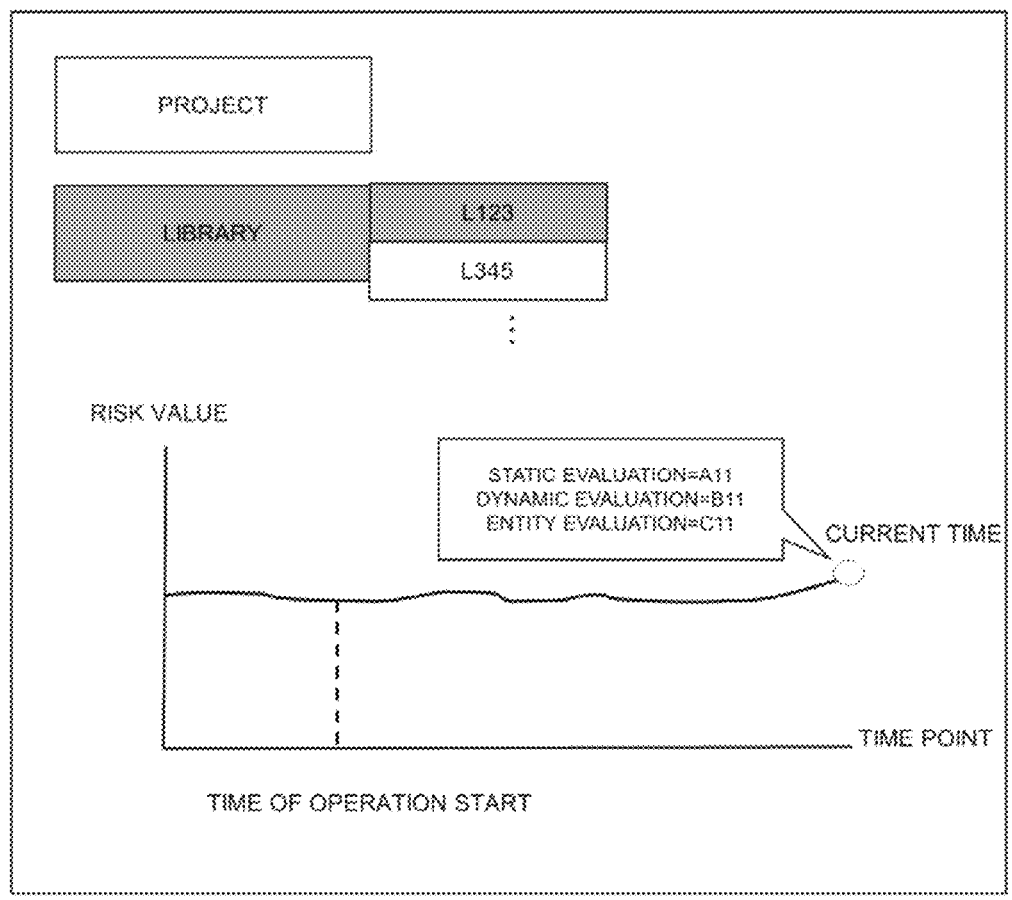
FIG. 15 is a diagram illustrating an example of the display by the evaluation apparatus according to the first example embodiment.

The risk information output unit 203 may display a breakdown of the risk values or may display the breakdown as information accompanying time-series data. For example, as illustrated in FIG. 15, the risk information output unit 203 may display the breakdown of unit evaluation at a specified time point.

Figure 16:
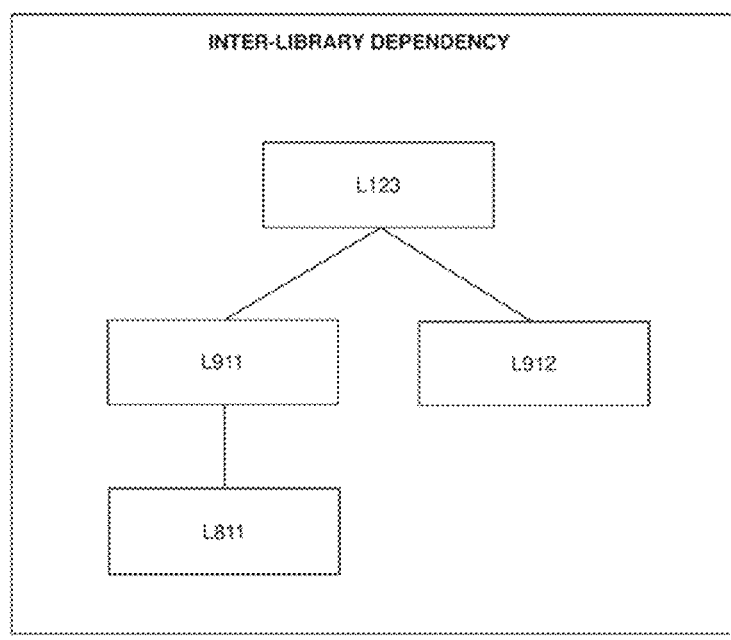
FIG. 16 is a diagram illustrating an example of the display by the evaluation apparatus according to the first example embodiment.

The risk information output unit 203 may display dependency (subordination) among the libraries, based on the library configuration information (refer to FIG. 5). For example, the risk information output unit 203 may provide display as that illustrated in FIG. 16.

The risk information output unit 203 may display information served as a basis for unit evaluation (for example, metadata). For example, the risk information output unit 203 may display information as that illustrated in FIG. 17.

Figure 18:
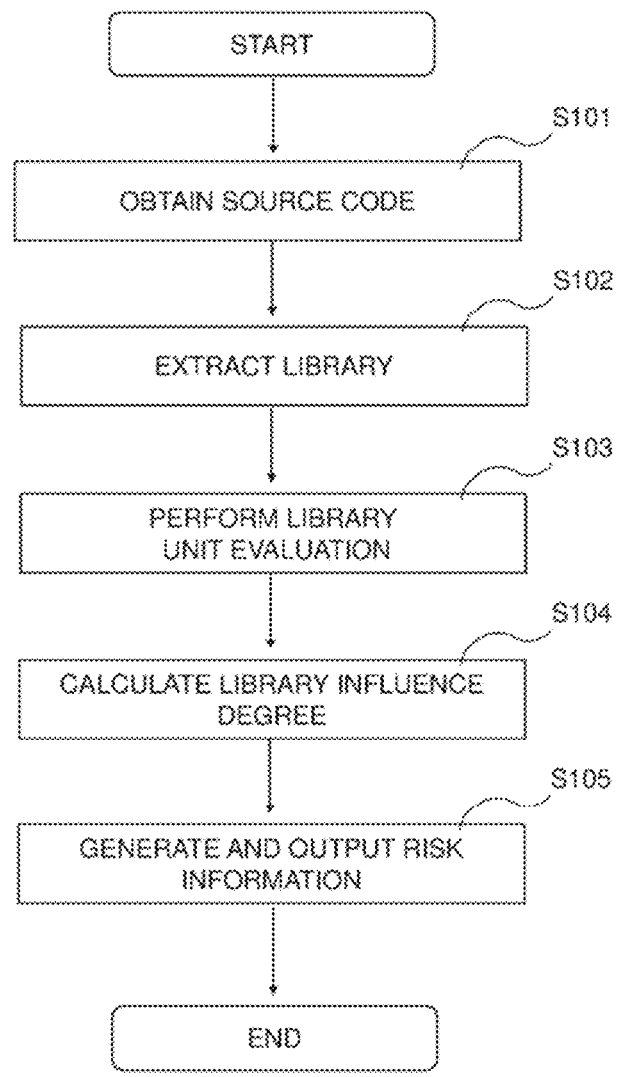
FIG. 18 is a flowchart illustrating an example of operation of the evaluation apparatus according to the first example embodiment.

The flowchart illustrated in FIG. 18 provides an overview of operation of the evaluation apparatus 10 according to the first example embodiment.

The evaluation apparatus 10 obtains a source code subject to evaluation (step S101).

The evaluation apparatus 10 extracts a library described in the source code (step S102).

The evaluation apparatus 10 performs unit evaluation of the extracted library (step S103).

The evaluation apparatus 10 calculates the degree of influence related to the extracted library (library influence degree) (step S104).

The evaluation apparatus 10 generates risk information, based on the library evaluation information and outputs the risk information (step S105).

Note that the risk evaluation of the source code using the evaluation apparatus 10 is performed at a regular or predetermined timing, and the result of the evaluation is stored in the storage unit 204 as history information. For example, the risk evaluation is performed at a timing of the source code of a project being released or the like.

As described above, the evaluation apparatus 10 according to the first example embodiment performs unit evaluation of each library described in a source code and presents, to an administrator or the like, a risk change of the source code, based on the evaluation. The administrator who has come in contact with the presented risk change can determine whether or not the risk of the project (the application) is allowable and the like. The evaluation apparatus 10 can also calculate a risk change of each library described in the source code and present the resultant to the administrator or the like. As a result of this, the administrator or the like can accurately obtain information indicating which library has a large change in risk and the like.

The evaluation apparatus 10 performs evaluation of each library every time the evaluation apparatus 10 obtains a source code, and hence it is possible to reveal potential risk that occurs due to a difference in version of libraries and the like. For example, such a situation may occur that, although a newer version of the library used at the time of operation start has been released, the version of the library described in an evaluation-target source code is the same as that of the time of operation start. In this case, among the types of library unit evaluation by the evaluation apparatus 10, the result of dynamic evaluation (evaluation using metadata) becomes worse, which results in an increase in risk value. The evaluation apparatus 10 detects such a situation that version update of the library is left undone, and notifies the administrator or the like of the risk that may occur due to the absence of the update.

Since the evaluation apparatus 10 scans, every time the evaluation apparatus 10 obtains a source code, the source code and calculates the degree of influence of each library included in the source code, it is possible to also reveal risk that occurs due to a change occurring on a side using the library. For example, the library A is used to be called by a single function at the time of operation start and such a revision that the library A is called by three functions has been made at the time of evaluation in some cases. In this case, although the risk value of the library A itself has not changed, the degree of influence of the library A on the whole source code (project) has increased (three times in the example). The evaluation apparatus 10 can calculate a risk value while taking account of the influence of the library on the whole source code, and can hence calculate a risk value to occur due to a change on the side using the library.

Second Example Embodiment

Next, a second example embodiment will be described in detail with reference to the drawings.

In the first example embodiment, the evaluation apparatus 10 provides risk information to the administrator or the like, and the administrator who has come in contact with the risk information determines the risk of a source code (the whole source code and each library). In the second example embodiment, a description will be given of a case where an evaluation apparatus 10 automatically determines the risk of a source code and presents the result of the determination to an administrator or the like.

Figure 19:
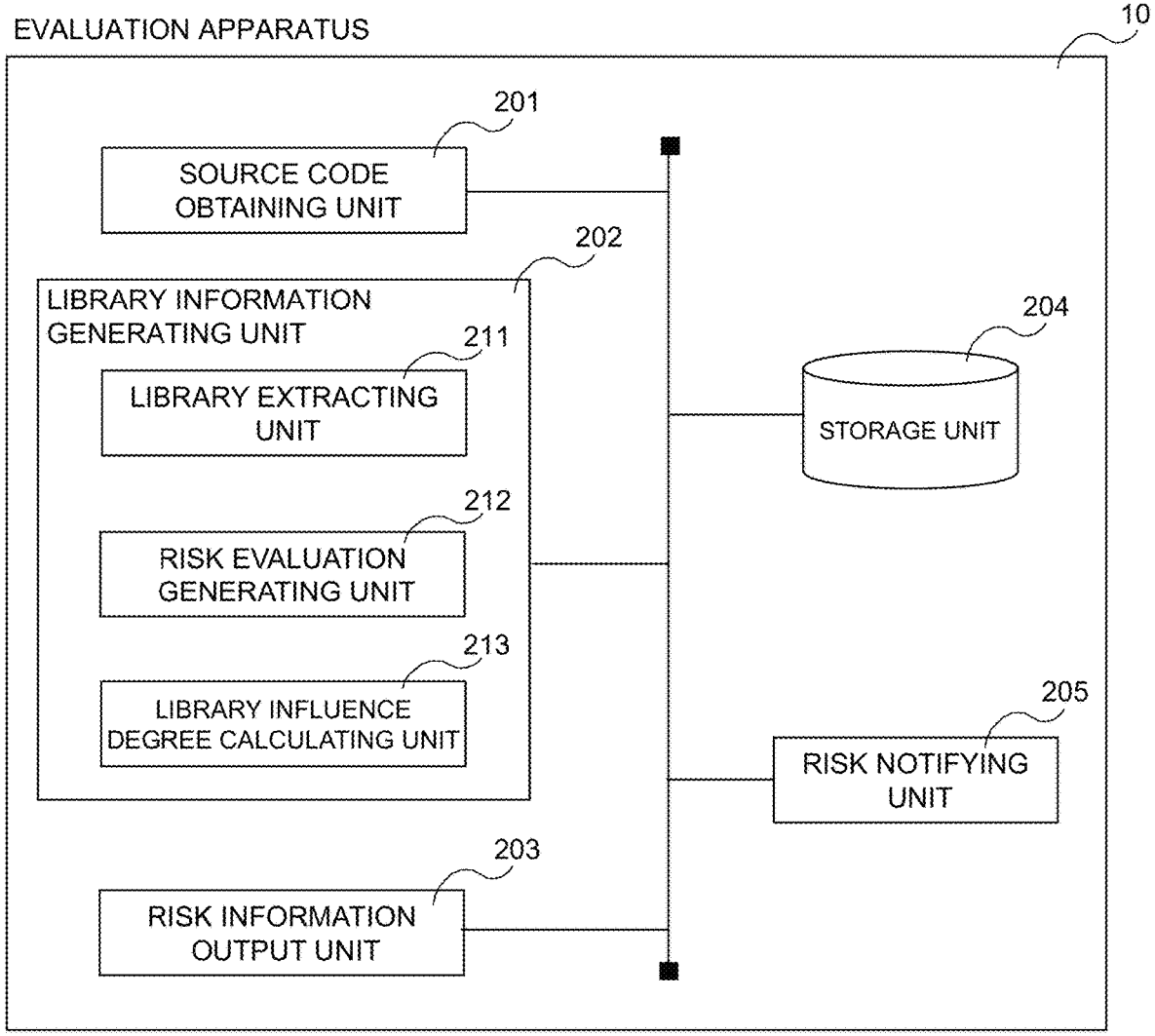
FIG. 19 is a diagram illustrating an example of a processing configuration of an evaluation apparatus according to a second example embodiment.

FIG. 19 is a diagram illustrating an example of a processing configuration (processing module) of the evaluation apparatus 10 according to the second example embodiment. With reference to FIGS. 3 and 19, a risk notifying unit 205 is added to the evaluation apparatus 10 according to the first example embodiment.

A description will be mainly given of differences between the first and second example embodiments.

The risk notifying unit 205 is a means for notifying an external apparatus that a source code has risk, in a case where a calculated risk value satisfies a predetermined condition. Concretely, when risk necessary for the administrator to be notified of is confirmed in a source code, the risk notifying unit 205 notifies accordingly.

For example, the risk notifying unit 205 performs threshold processing on a risk value (a risk value of an application program or a risk value related to an individual library) generated by the risk information output unit 203. The risk notifying unit 205 notifies the administrator or the like that "there is risk in the source code" when the risk value is equal to or larger than a predetermined threshold. Concretely, the risk notifying unit 205 performs display as that illustrated in FIG. 20.

When the risk value of a particular library is larger than a threshold, the risk notifying unit 205 may notify the administrator or the like accordingly. For example, the risk notifying unit 205 performs display as that illustrated in FIG. 21.

The risk notifying unit 205 may calculate a risk increase rate between the time of operation start and the current moment and make notification corresponding to the calculated risk increase rate. The calculation of the risk increase rate may be related to the whole application program or may be related to an individual library.

Figure 22:
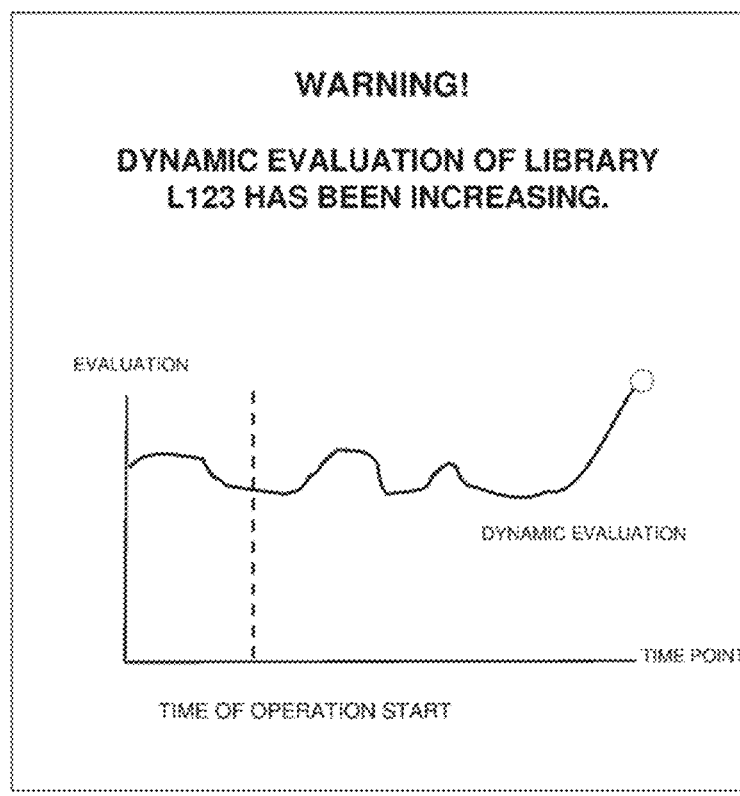
FIG. 22 is a diagram illustrating an example of the display by the evaluation apparatus according to the second example embodiment.

The risk notifying unit 205 may calculate a risk increase rate for each of the evaluations (the static evaluation, the dynamic evaluation, and the entity evaluation) constituting the unit evaluation of each library. For example, when the dynamic evaluation related to a particular library has increased extremely compared to that of the time of operation start, the risk notifying unit 205 notifies the administrator or the like accordingly. In this case, the risk notifying unit 205 may perform display as that illustrated in FIG. 22. FIG. 22 displays information indicating an increase in dynamic evaluation of the library "L123" and time-series data of the dynamic evaluations including those of the time of operation start and the current time point.

As described above, the evaluation apparatus 10 according to the second example embodiment detects variation in risk of a source code and notifies, when it is necessary to notify an administrator of the like of the variations in risk, the administrator or the like accordingly. As a result, the administrator or the like does not need to comprehensively check a change in risk of each library described in the source code and can hence prevent from overlooking serious risk.

Figure 23:
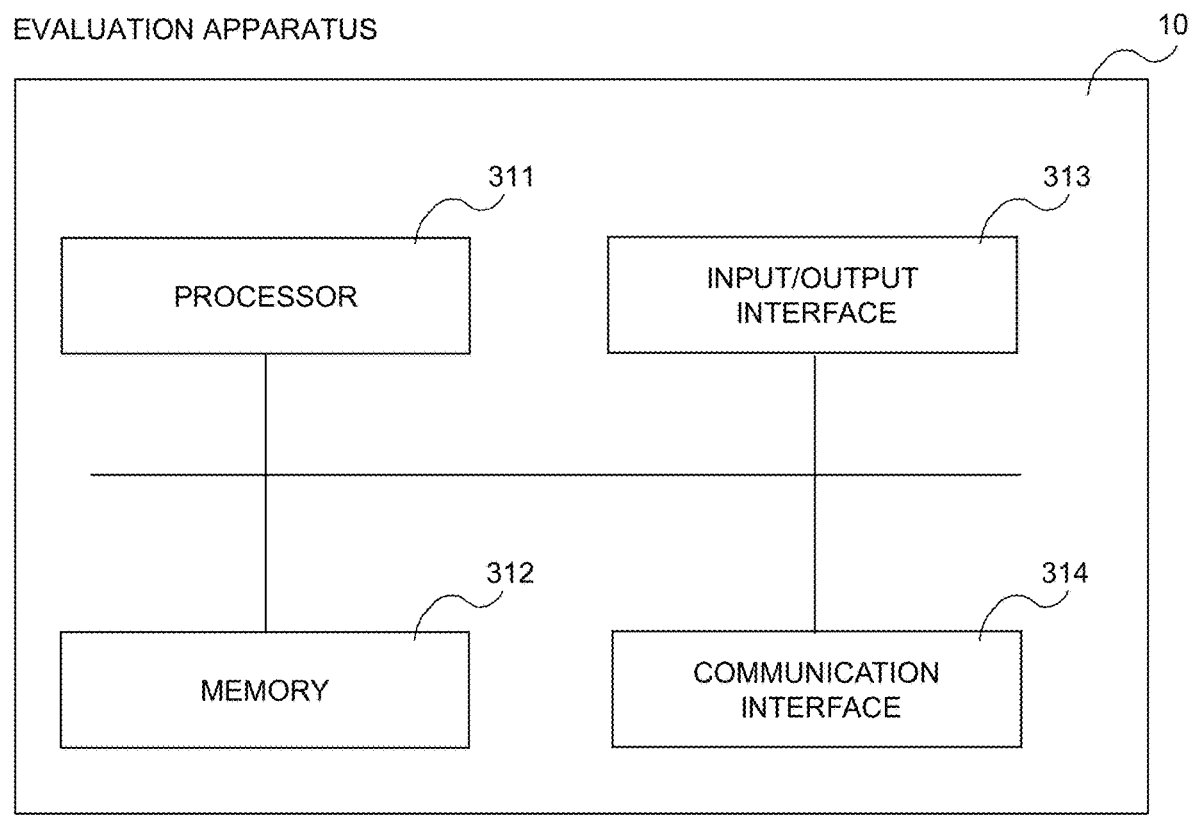
FIG. 23 is a diagram illustrating an example of a hardware configuration of the evaluation apparatus.

Next, hardware of the evaluation apparatus 10 will be described. FIG. 23 is a diagram illustrating an example of a hardware configuration of the evaluation apparatus 10.

The evaluation apparatus 10 can be configured with an information processing apparatus (so-called, a computer), and includes a configuration illustrated in FIG. 23. For example, the evaluation apparatus 10 includes a processor 311, a memory 312, an input/output interface 313, a communication interface 314, and the like. Constituent elements such as the processor 311 are connected to each other with an internal bus or the like, and are configured to be capable of communicating with each other.

Note that the configuration illustrated in FIG. 23 is not to limit the hardware configuration of the evaluation apparatus 10. The evaluation apparatus 10 may include hardware not illustrated, or need not include the input/output interface 313 as necessary. The number of processors 311 and the like included in the evaluation apparatus 10 is not to be limited to the example illustrated in FIG. 23, and for example, a plurality of processors 311 may be included in the evaluation apparatus 10.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC) or the like.

The function of the evaluation apparatus 10 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Example Alterations

Note that the configuration, the operation, and the like of the evaluation apparatus 10 described in the example embodiments are merely examples, and are not to limit the configuration and the like of the apparatus. For example, the functions of the evaluation apparatus 10 described above may be implemented by different apparatuses. Concretely, the functions of the library information generating unit 202 and the risk information output unit 203 may be implemented by different apparatuses.

In the example embodiments, the description has been given that the risk evaluation generating unit 212 scans a source code and performs unit evaluation based on "static code analysis" for analyzing the contents described in the source code. However, an executable file generated from an evaluation-target source code may be executed, to perform "dynamic program analysis" for analyzing the evaluation-target source code. For example, a test program for flagging every time each library is called may be prepared, and the number of times the library is called per unit time may be used as an evaluation.

In the example embodiments, risk of a source code is evaluated from an example aspect (viewpoint) of the libraries described in the source code. However, risk of the source code may be evaluated by taking account of the result of evaluation of the source code itself For example, analysis similar to code analysis (analysis using the number of lines, complexity, and the like) of each library may be performed on the source code, and the result of the analysis may be reflected in a risk value of the whole source code.

In the example embodiments, the description has been given that, in calculating the degree of risk of each library, unit evaluations (the static evaluation, the dynamic evaluation, and the entity evaluation) of the library are added together. However, in calculating the degree of risk, the degree of risk may be calculated by performing weighted average using a weight given in advance to each item. For example, among the three evaluations, such weights as to place greater importance on the dynamic evaluation may be determined to calculate the degree of risk of the library.

When calculating the three evaluations (the static evaluation, the dynamic evaluation, and the entity evaluation), a technique of machine learning may be applied to all or part of the calculation. For example, in calculation of an entity evaluation using a source code, a number of source codes of excellent libraries with little vulnerability are collected, and the collected source codes are prepared as teacher data, with a label providing high evaluation. By generating a learning model by using the teacher data and inputting a source code of an evaluation-target library to the learning model, the difference from the teacher data is output as a score. The score output from the learning model may be treated as an entity evaluation.

In the example embodiments, the description has been given of a case where evaluation of a child library is included in evaluation of a parent library as a risk factor. Evaluations of a child library and a grandchild library may be included in evaluation of a parent library. In this case, the risk evaluation generating unit 212 generates a library evaluation result as that illustrated in FIG. 24. In FIG. 24, the child library "L911" of the parent library "L123" is extracted as a first risk factor, and the grandchild library "L811" is extracted as a second risk factor. Note that the extraction of the risk factors is assumed to be the same as the contents described above, and hence the description is omitted.

The evaluation apparatus 10 described above treats source codes related to a plurality of projects. Hence, such a situation may occur that different projects use libraries in common. In this case, when the same library as a library for which unit evaluation has already been completed is used by another project (source code), the evaluation apparatus 10 may reuse the result of the unit evaluation of the library.

By installing an evaluation program in a storage unit of a computer, the computer can be caused to function as an evaluation apparatus. By causing the computer to execute the evaluation program, an evaluation method can be executed by the computer.

In the flowchart in the description above, a plurality of processes (processing) are described in order; however, the order of execution of the processes executed in each example embodiment is not limited to the described order. In each example embodiment, the illustrated order of processes can be changed as far as there is no problem with regard to processing contents, such as a change in which respective processes are executed in parallel, for example. The example embodiments can be combined within a range that contents do not contradict each other.

Part of or all of the example embodiments may be described as in the following supplementary notes but are not limited to the following.

Supplementary Note 1

An evaluation apparatus (10, 100) comprising:
a generating unit (101, 212) configured to generate an evaluation related to risk of a first library described in a source code; and
an output unit (102, 203) configured to calculate a degree of risk of the first library, based on at least the generated evaluation, calculate a risk value indicating risk inherent in the source code based on the calculated degree of risk, and output time-series data of the calculated risk value.

Supplementary Note 2

The evaluation apparatus (10, 100) according to supplementary note 1, wherein
the generating unit (101, 212) is configured to generate, in a case where a second library called by the first library is included in the source code, an evaluation related to risk of the second library, and
the output unit (102, 203) is configured to reflect the evaluation of the second library in the degree of risk of the first library.

Supplementary Note 3

The evaluation apparatus (10, 100) according to supplementary note 2, further comprising
a calculating unit (213) configured to calculate a degree of influence of the first library on whole of the source code, wherein
the output unit (102, 203) is configured to reflect the calculated degree of influence in the degree of risk of the first library.

Supplementary Note 4

The evaluation apparatus (10, 100) according to supplementary note 3, wherein the generating unit (101, 212) is configured to evaluate the first library, based on pieces of information different in property from each other, and generate evaluations for the respective pieces of information different from each other.

Supplementary Note 5

The evaluation apparatus (10, 100) according to supplementary note 4, wherein the output unit (102, 203) is configured to calculate total of the evaluations generated for the respective pieces of information different from each other, as the degree of risk of the first library.

Supplementary Note 6

The evaluation apparatus (10, 100) according to supplementary note 5, wherein the output unit (102, 203) is configured to identify an evaluation having a largest value among evaluations generated related to the second library for the respective pieces of information different from each other, and add the identified evaluation to the total of the evaluations generated related to the first library, to thereby calculate the degree of risk of the first library.

Supplementary Note 7

The evaluation apparatus (10, 100) according to supplementary note 5 or 6, wherein the output unit (102, 203) is configured to multiply the total of the evaluations by the degree of influence, to thereby calculate the degree of risk of the first library.

Supplementary Note 8

The evaluation apparatus (10, 100) according to any one of supplementary notes 4 to 7, wherein the generating unit (101, 212) is configured to generate a static evaluation, based on static information related to the first library, generate a dynamic evaluation, based on dynamic information related to the first library, and generate an entity evaluation, based on a source code of the first library.

Supplementary Note 9

The evaluation apparatus (10, 100) according to any one of supplementary notes 1 to 7, wherein the output unit (102, 203) is configured to calculate total of degrees of risk calculated for libraries included in the source code, as a risk value of whole of the source code, and display time-series data of the calculated risk value of the whole of the source code.

Supplementary Note 10

The evaluation apparatus (10, 100) according to supplementary note 9, wherein the output unit (102, 203) is configured to display time-series data of the degree of risk of the first library.

Supplementary Note 11

The evaluation apparatus (10, 100) according to supplementary note 10, wherein the output unit (102, 203) is configured to generate a graphical user interface (GUI) for switching an item for which the time-series data of the risk value is displayed.

Supplementary Note 12

The evaluation apparatus (10, 100) according to any one of supplementary notes 1 to 11, further comprising a notifying unit configured to notify, in a case where the calculated risk value satisfies a predetermined condition, an external apparatus that there is risk in the source code.

Supplementary Note 13

An evaluation method comprising, in an evaluation apparatus (10, 100):
generating an evaluation related to risk of a first library described in a source code; and
calculating a degree of risk of the first library, based on at least the generated evaluation, calculating a risk value indicating risk inherent in the source code based on the calculated degree of risk, and outputting time-series data of the calculated risk value.

Supplementary Note 14

A program causing a computer (311) mounted in an evaluation apparatus (10, 100) to execute:
processing of generating an evaluation related to risk of a first library described in a source code; and
processing of calculating a degree of risk of the first library, based on at least the generated evaluation, calculating a risk value indicating risk inherent in the source code based on the calculated degree of risk, and outputting time-series data of the calculated risk value.

Note that the mode of supplementary note 13 and the mode of supplementary note 14 can be developed to the modes of supplementary note 2 to supplementary note 12, similarly to the mode of supplementary note 1.

Note that each of the cited disclosures in the Citation List is to be incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST

10, 100 Evaluation Apparatus
101 Generating Unit
102 Output Unit
201 Source Code Obtaining Unit
202 Library Information Generating Unit
203 Risk Information Output Unit
204 Storage Unit
205 Risk Notifying Unit
211 Library Extracting Unit
212 Risk Evaluation Generating Unit
213 Library Influence Degree Calculating Unit
311 Processor
312 Memory
313 Input/Output Interface
314 Communication Interface

What is claimed is:
1. An evaluation apparatus for evaluation of source code risk comprising:
a memory storing instructions; and
one or more processors configured to execute the instructions to:
obtain source code by storing the source code in the memory;
read the source code stored in the memory;
generate first evaluations related to risk of a first library for first information to Nth information, respectively, which differ in a property for the first library described in the source code;
calculate a degree of influence indicating influence of the first library on a whole of the source code;
generate, in a case where a second library called by the first library is included in the source code, second evaluations related to risk of the second library for the first information to the Nth information, respectively, which differ in a property for the second library;
identify, among the second evaluations related to the risk of the second library for the first information to the Nth information, an evaluation having a largest value; and
add the identified evaluation to a total of the first evaluations related to the risk of the first library;
calculate a degree of risk of the first library based on the total of the first evaluations related to the risk of the first library to which the identified evaluation related to the risk of the second library has been added, and based on the calculated degree of influence;
calculate a risk value indicating risk inherent in the source code based on the calculated degree of risk; and
output time-series data of the calculated risk value.

2. The evaluation apparatus according to claim 1, wherein the one or more processors are configured to execute the instructions to multiply the total of the first evaluations related to the risk of the first library to which the identified evaluation related to the risk of the second library has been added, by the degree of influence, to calculate the degree of risk of the first library.

3. The evaluation apparatus according to claim 1, wherein the one or more processors are configured to execute the instructions to generate a static evaluation based on static information related to the first library, generate a dynamic evaluation based on dynamic information related to the first library, and generate an entity evaluation based on source code of the first library.

4. The evaluation apparatus according to claim 1, wherein the one or more processors are configured to execute the instructions to calculate a total of degrees of risk calculated for libraries included in the source code, as a risk value of the whole of the source code, and display the time-series data of the calculated risk value of the whole of the source code.

5. The evaluation apparatus according to claim 4, wherein the one or more processors are configured to execute the instructions to display the time-series data of the degree of risk of the first library.

6. The evaluation apparatus according to claim 5, wherein the one or more processors are configured to execute the instructions to generate a graphical user interface (GUI) for switching an item for which the time-series data of the risk value is displayed.

7. The evaluation apparatus according to claim 1, wherein the one or more processors are further configured to execute the instructions to notify, in a case where the calculated risk value satisfies a predetermined condition, an external apparatus that there is risk in the source code.

8. An evaluation method for evaluation of source code risk performed by an evaluation apparatus and comprising:
obtaining source code by storing the source code in memory;
reading the source code stored in the memory;
generating first evaluations related to risk of a first library for first information to Nth information, respectively, which differ in a property for the first library described in the source code;
calculating a degree of influence indicating influence of the first library on a whole of the source code;
generating, in a case where a second library called by the first library is included in the source code, second evaluations related to risk of the second library for the first information to the Nth information, respectively, which differ in a property for the second library;
identifying, among the second evaluations related to the risk of the second library for the first information to the Nth information, an evaluation having a largest value; and
adding the identified evaluation to a total of the first evaluations related to the risk of the first library;
calculating a degree of risk of the first library based on the total of the first evaluations related to the risk of the first library to which the identified evaluation related to the risk of the second library has been added, and based on the calculated degree of influence;
calculating a risk value indicating risk inherent in the source code based on the calculated degree of risk; and
outputting time-series data of the calculated risk value.

9. A non-transitory computer readable recording medium storing a program executable by an evaluation apparatus for evaluation of source code risk, to perform processing comprising:
obtaining source code by storing the source code in memory;
reading the source code stored in the memory;
generating first evaluations related to risk of a first library for first information to Nth information, respectively, which differ in a property for the first library described in the source code;
calculating a degree of influence indicating influence of the first library on a whole of the source code;
generating, in a case where a second library called by the first library is included in the source code, second evaluations related to risk of the second library for the first information to the Nth information, respectively, which differ in a property for the second library;
identifying, among the second evaluations related to the risk of the second library for the first information to the Nth information, an evaluation having a largest value; and
adding the identified evaluation to a total of the first evaluations related to the risk of the first library;
calculating a degree of risk of the first library based on the total of the first evaluations related to the risk of the first library to which the identified evaluation related to the risk of the second library has been added, and based on the calculated degree of influence;
calculating a risk value indicating risk inherent in the source code based on the calculated degree of risk; and
outputting time-series data of the calculated risk value.

* * * * *